United States Patent
Beeman

[11] Patent Number: 6,009,587
[45] Date of Patent: Jan. 4, 2000

[54] FOLDING RAMP

[76] Inventor: Randall E. Beeman, 208 Satterwhite, White Oak, Tex. 75693

[21] Appl. No.: 08/728,909

[22] Filed: Oct. 11, 1996

[51] Int. Cl.[7] ............................ B65G 67/02; E01D 15/00
[52] U.S. Cl. ........................................... 14/69.5; 414/537
[58] Field of Search .................................. 14/69.5, 71.1; 414/537; D34/32; 296/61

[56] References Cited

U.S. PATENT DOCUMENTS

| | | | |
|---|---|---|---|
| D. 316,771 | 5/1991 | Murray | D34/32 |
| 4,685,857 | 8/1987 | Goeser et al. | 296/61 X |
| 4,761,847 | 8/1988 | Savage et al. | 14/69.5 |
| 4,864,672 | 9/1989 | Altieri et al. | 14/69.5 |
| 4,913,615 | 4/1990 | Ward | 414/537 |
| 5,062,174 | 11/1991 | DaSalvo | 14/69.5 |
| 5,156,432 | 10/1992 | McCleary | 296/61 |
| 5,214,818 | 6/1993 | Cook | 14/71.1 |
| 5,257,894 | 11/1993 | Grant | 414/537 |
| 5,287,579 | 2/1994 | Estevez, Jr. | 14/71.1 |
| 5,306,112 | 4/1994 | Kielinski | 14/69.5 X |
| 5,325,558 | 7/1994 | Labreche | 14/69.5 |
| 5,440,773 | 8/1995 | Lentini | 14/69.5 |

*Primary Examiner*—James A. Lisehora
*Attorney, Agent, or Firm*—Patent & Trademark Services; Joseph H. McGlynn

[57] ABSTRACT

A folding ramp which contains at least two ramp members which are pivoted together. The underside of the ramp has a plurality of bars or rods which form part of the pivot mechanism and which, in addition, add strength and structural rigidity to the ramp.

8 Claims, 3 Drawing Sheets

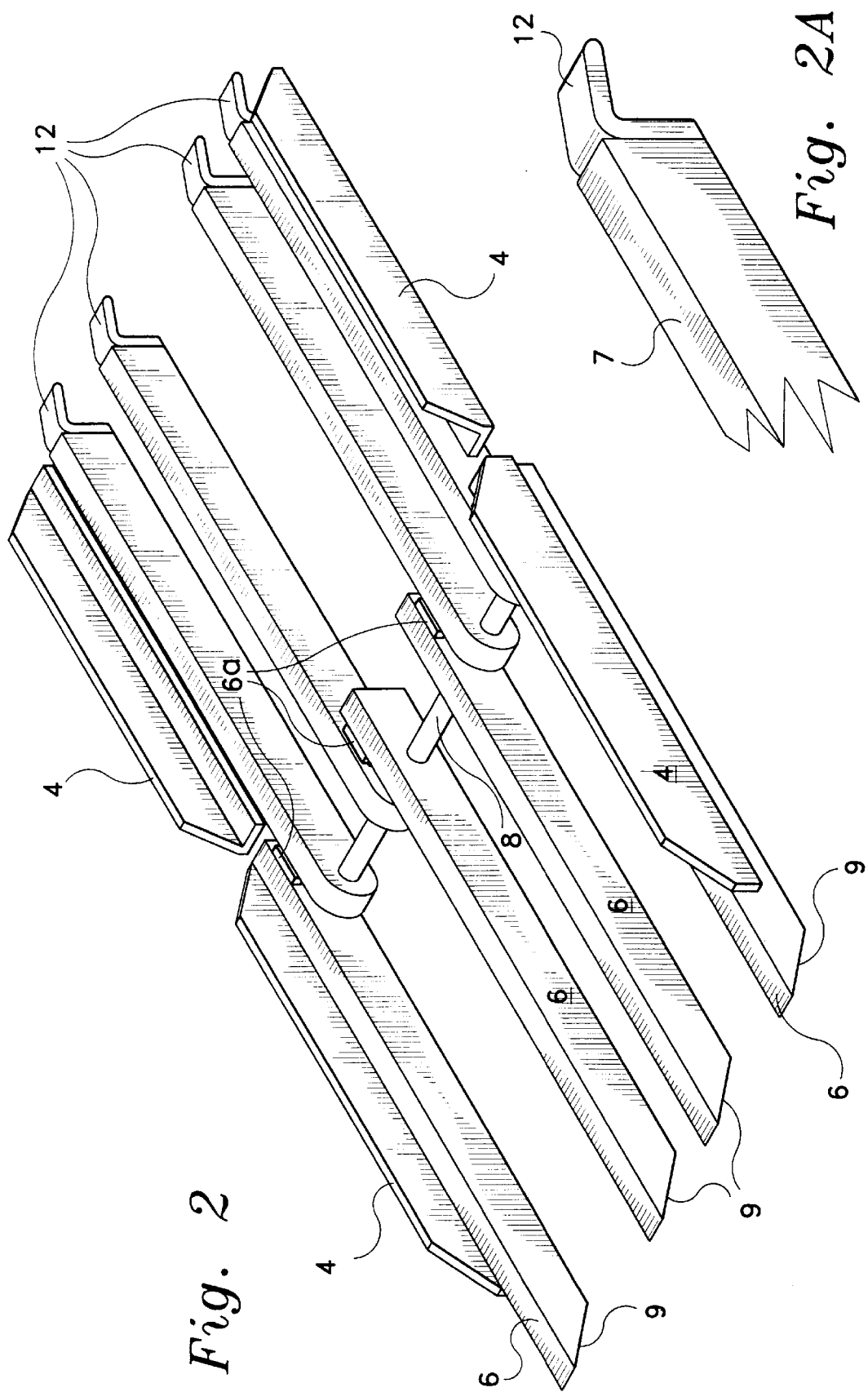

FOLDING RAMP

BACKGROUND OF THE INVENTION

This invention relates, in general, to ramps used to ascend or descend from a vehicle, and, in particular, to a folding ramp used to ascend or descend from a vehicle.

DESCRIPTION OF THE PRIOR ART

In the prior art various types of ramps have been proposed. For example, U.S. Pat. No. 4,761,847 discloses a ramp comprised of a plurality of rectangular panels which are pivotally hinged along adjacent sidewalls which allow the ramp to be folded. A cable and hinge system is positioned on the underside of the ramp to provide structural support. U.S. Pat. No. 4,913,615 discloses a hinged ramp having a first and second plate-like members which are hinged together. The plate-like members matingly engage with the inside surface of each member attached to the hinge to provide a rigid ramp surface. U.S. Pat. No. 5,062,174 discloses a folding ramp with a plurality of ramp panels hinged together horizontally and a longitudinal hinge for foldably connecting the panels adjacent to both sides so the support panels fold with the ramp panels. U.S. Pat. No. 5,325,558 discloses a wheel chair ramp comprising first and second U-shaped tracks hinged together, with an adjustable connecting link between the tracks to maintain the tracks in alignment.

The prior art ramp devices suffer many drawbacks. For example, the U.S. Pat. No. 4,761,847 uses a complicated cable and hinge system for structural support. This system is expensive to manufacture and maintain. The U.S. Pat. Nos. 4,913,615 and 5,062,174 rely on the hinge between the panels for structural strength. The means used to attach the hinges will limit the amount of loads that these ramps can carry. The U.S. Pat. No. 5,325,558 uses individual tracks for each of the wheels on a wheel chair, and an adjustable link to hold the tracks in position. This requires that the tracks will have to be adjusted for different types of chairs.

What is needed is a ramp that is easy to fold and unfold, and a ramp that can be manufactured inexpensively and will be able to support heavy loads.

SUMMARY OF THE INVENTION

The present invention comprises a folding ramp which contains at least two ramp members which are pivoted together. The underside of the ramp has a plurality of bars or rods which form part of the pivot mechanism and which, in addition, add strength and structural rigidity to the ramp. This ramp provides the strength of a single piece ramp of similar construction with the advantage of a folding ramp for transportation and storage.

It is an object of the present invention to provide an improved folding ramp which can be easily folded for storage or transportation to a destination for off loading cargo.

It is an object of the present invention to provide an improved folding ramp which has added strength members to support the ramp under heavy loads.

It is an object of the present invention to provide an improved folding ramp which is inexpensive to manufacture.

These and other objects and advantages of the present invention will be fully apparent from the following description, when taken in connection with the annexed drawings.

BRIEF DESCRIPTION OF THE DRAWINGS

FIG. 2 is a perspective view of the present invention with the ramp surfaces removed.

FIG. 2a is a partial perspective view of the present invention showing the end which will attach to a vehicle.

DESCRIPTION OF THE PREFERRED EMBODIMENT

Figure 1A:
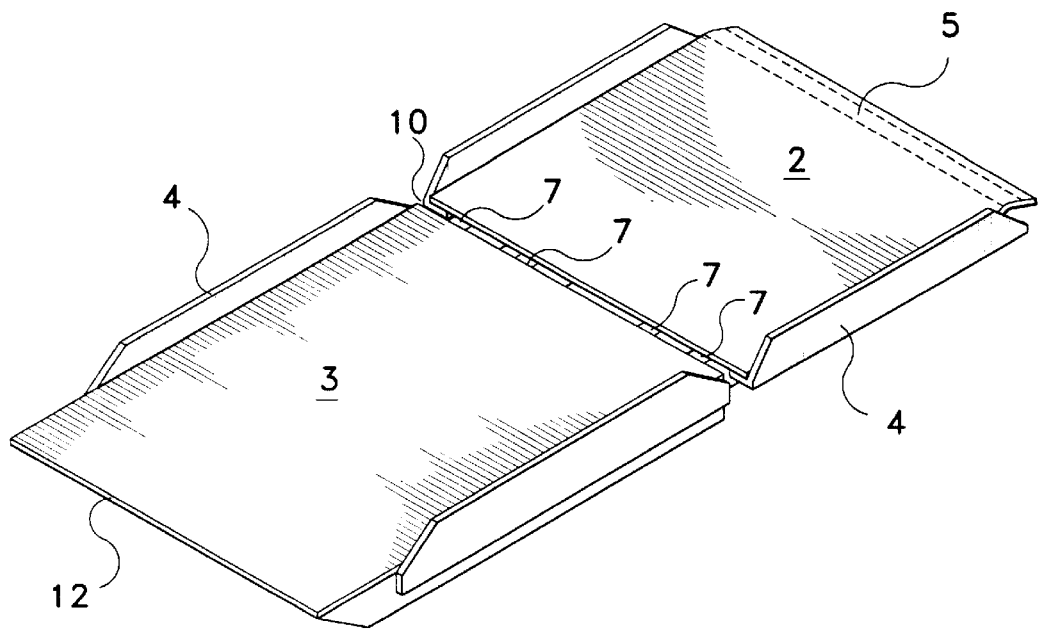
FIG. 1a is perspective view of the present invention.
Figure 1B:
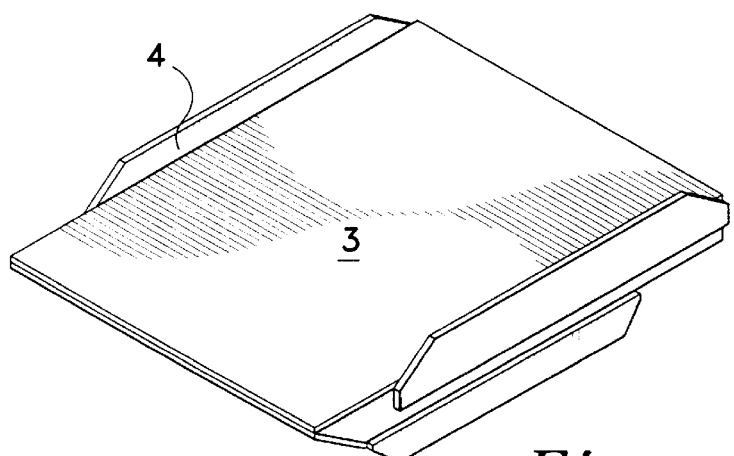
FIG. 1b is perspective view of the present invention in a folded condition.
Figure 1C:
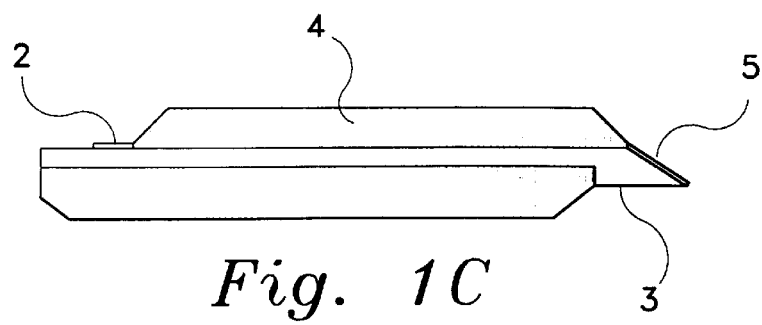
FIG. 1c is side view of the present invention in a folded condition.

Referring now to the drawings in greater detail, FIG. 1 shows a perspective view of the present invention, which is a ramp that folds for transportation or storage. It comprises a pair of ramp surfaces, an upper surface 2 (which will rest on a truck bed or loading dock), and a lower surface 3 (which will engage the ground) which can be made of metal, wood or plastic, depending on the weight they are designed to carry. That is if the ramp is designed to be used with heavy loads, the ramp surfaces 2, 3 would be made from metal, and if the ramp is designed to be used with light loads, the ramp surfaces 2, 3 would be made from a rigid plastic.

Each ramp surface has a pair of side rails 4 which are connected to the sides of the ramp surfaces by any conventional fastening means such as, but not limited to, welding or screw fasteners. The side rails would help to ensure that when loading items using the ramp, the items will not roll or fall off the sides of the ramps. The side rails 4 would normally be made from the same type of materials as the ramp surfaces 2, 3. The upper ramp surfaces 2 would have a slanted portion 5 at its upper end to lap over and onto a truck bed thereby supporting the weight of the ramp and its cargo. The slanted portion 5 would be unitary with the ramp surface 2 and reinforced by angled supports 12 (see FIG. 2a).

Figure 3:
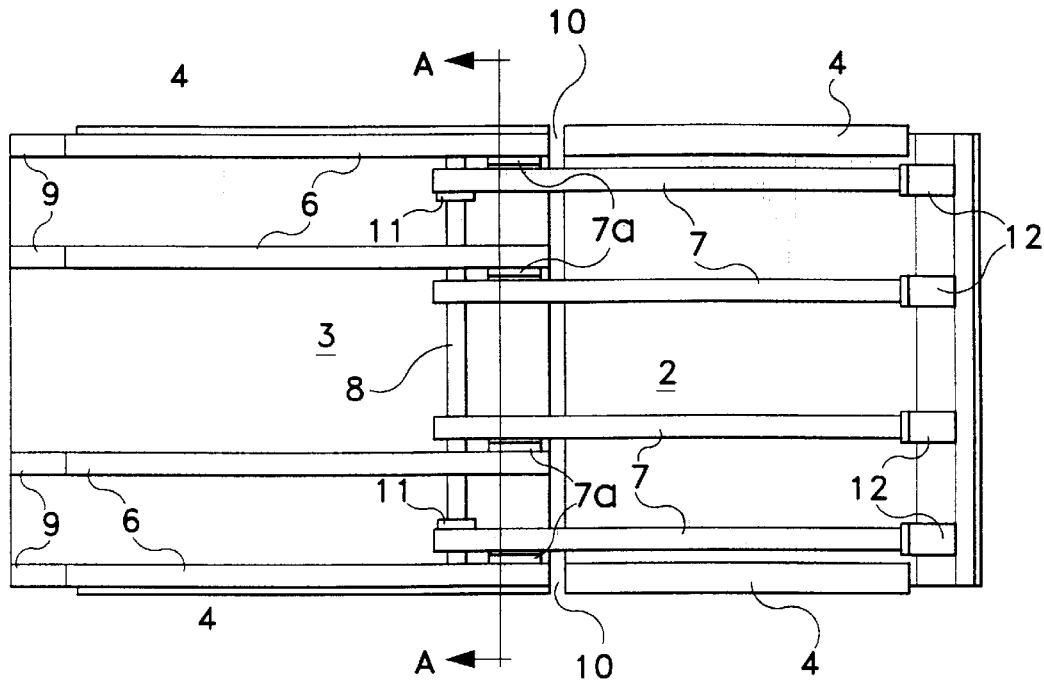
FIG. 3 is a plan view of the underside of the present invention.

As shown in FIGS. 2 and 3, the underside of the ramp 1 has a plurality of longitudinally extending support bars 6, 7, which may be made from metal, and which extend substantially the full length of the ramp surfaces 2, 3. The lower support bars 6 will have a chamfered end 9 which will engage the ground. The support bars 7 will be attached to angled supports 12, which supports the weight of the ramp plus the cargo onto the truck bed in the area of slanted portion 5. The support bars 6, 7 could be attached to the under side of the ramp surfaces 2, 3 by any conventional fastening means.

The support bars 6, 7 are offset such that, when being folded, the support bar 7 will not create a shearing effect (see FIG. 3). The support bars 6, 7 are joined together by a rod 8 which extends through apertures in each of the bars. A nut 11 could be used to help secure rod 8 to the support bars 6.

Figure 3A:
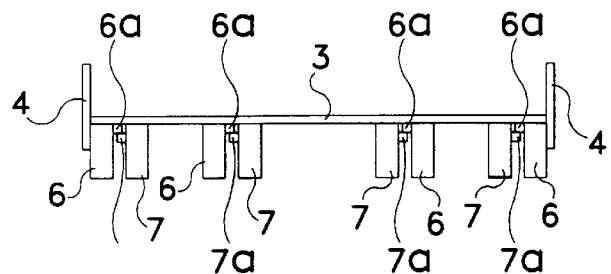
FIG. 3a is a section view taken along the section line A—A of FIG. 3 showing the load bearing blocks.
Figure 4:
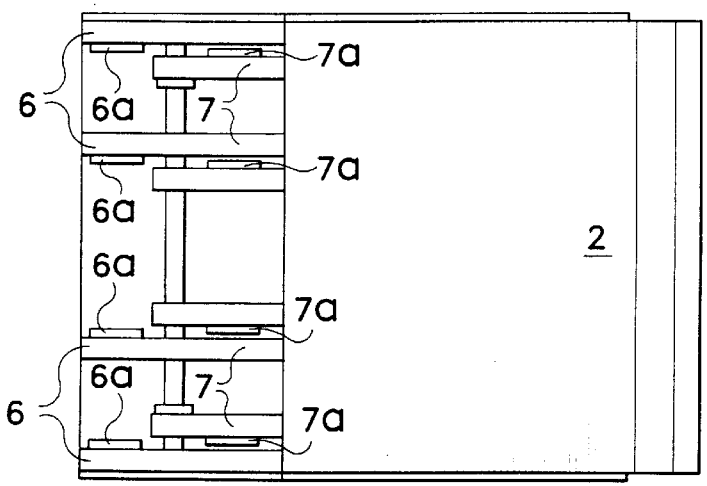
FIG. 4 is a plan view of the underside of the present invention showing the ramp in the folded position.

The support bars 6 and 7 also have permanently attached thereto load bearing support blocks 6a, 7a respectively (see FIGS. 2 and 3). The load bearing support blocks 6a, 7a share the "load responsibility" of the ramp and its cargo, along with the hinge rod 8, by serving as load transfer devices to the support bars 6, 7 (see FIG. 3a). Thus, when the ramp is in the unfolded position, 6a is resting on 7a, sharing the load with rod 8. As cargo moves up the ramp, a portion of the load, while on the lower surface 3, is transferred to the upper surface 2. When the load moves onto the upper surface 2, the lower surface 3 continues to share the "load responsibility". This is made possible by the the designed load sharing mechanism which is comprised of the hinge rod 8 and the load bearing support blocks 6a, 7a.

As shown in FIG. 3, the support bars 6 extend along the full underside of the ramp lower surface 3, while the support bars 7 extend fully under surface 2 and partially under surface 3 to the hinge rod 8. In this way the rod 8, which forms the hinge for folding the ramp for transportation or storage, is positioned under the ramp surface 3. This provides the folding ramp with several advantages over previous prior art ramps. The first is that the upper support bars 7 extending partially under the ramp lower surface 3 will support the adjoining edges of both ramp surfaces and prevent heavy loads from depressing the surface as they pass from one ramp surface to another. The second is that by moving the hinge (rod 8) away from the joint between the edges of the ramp surfaces, a permanent gap 10 can be provided between the adjacent edges of the ramp surfaces 2, 3. This gap will prevent a user from catching his/her fingers between the ramp surfaces when the ramp is being folded or unfolded. The third advantage is that in the area between the hinge rod 8 and the load bearing support blocks 6a, 7a, the middle portion of the ramp, which incurs the greatest stress, is supported by both of the support bars 6, 7. Finally, this design allows the ramp to be folded to approximately 60% of its useful length for storage or transportation, while maintaining the strength normally found only in a single piece ramp.

In use, the ramp 1, when it is needed to load items onto a truck bed or platform, would be moved in a folded position to the desired location. Then the ramp would be unfolded, and edge 5 would be placed on the truck bed or platform and the slanted end 9 would be placed on the ground. Items could then be transferred from the ground to the truck bed or platform by the user walking up the ramp or by moving items by means of a hand cart from the ground to the truck bed or platform. The longitudinal extending support bars 6, 7 provide structural rigidity so the ramp can handle heavy loads.

Although the Folding Ramp and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A portable folding loading ramp adapted to help move items from the ground to a raised platform comprising:

at least a first and a second ramp surface, each ramp surface having sides, a first end, a second end, a top surface and a bottom surface, said first end of said first ramp surface being positioned adjacent said first end of said second ramp surface, and said second end of said first ramp surface being positioned remote from said second end of said second ramp surface, a plurality of support bars attached to the bottom surface of said first ramp surface, a plurality of support bars attached to the bottom surface of said second ramp surface, and said plurality of support bars attached to the bottom surface of said second ramp surface extending along substantially the entire second ramp surface from said first end to said second end, said plurality of support bars attached to the bottom surface of said first ramp surface extending along substantially the entire first ramp surface from said first end to said second end, and extending partly under said second ramp surface, each of said plurality of support bars attached to the bottom surface of said first ramp surface having a first end positioned adjacent said first end of said first ramp surface and a second end positioned adjacent said second end of said first ramp surface, and each of said plurality of support bars attached to the bottom surface of said second ramp surface having a first end positioned adjacent said first end of said second ramp surface and a second end positioned adjacent said second end of said second ramp surface, and each of said plurality of support bars attached to the bottom surface of said first and second ramp surfaces have an aperture therein, said apertures in said plurality of support bars attached to the bottom surface of said first and second ramp surfaces being aligned, and a bar extending through said aligned apertures, said apertures in said plurality of support bars attached to the bottom surface of said first ramp surface being positioned directly adjacent an end of said plurality of support bars and said end is positioned beneath said second ramp surface, said apertures in said plurality of support bars attached to the bottom surface of said second ramp surface being positioned between said first end of said support bars and said second end of the support bars which are attached to the bottom surface of said second ramp surface.

2. The portable folding loading ramp as claimed in claim 1, wherein said hinge means is a rod which is connected to said plurality of support bars.

3. The portable folding loading ramp as claimed in claim 1, wherein a safety gap is formed between adjacent edges of said first and second ramp surface when said ramp is in the unfolded position.

4. The portable folding loading ramp as claimed in claim 1, wherein one of said ramp surfaces has a slanted edge.

5. The portable folding loading ramp as claimed in claim 1, wherein ramp surfaces have side rails attached to two of said sides.

6. The portable folding loading ramp as claimed in claim 1, wherein said plurality of support bars attached to the bottom surface of said first and second ramp surface have load bearing support blocks attached thereto, and wherein load responsibility is distributed and shared by said plurality of support bars attached to the bottom surface of said first and second ramp surface, said hinge means and said load bearing support blocks.

7. The portable folding loading ramp as claimed in claim 1, wherein a safety gap is formed between adjacent edges of said support bars and said first and second ramp surfaces when said ramp is in the folded position.

8. The portable folding loading ramp as claimed in claim 1, wherein each support bar has a support block attached permanently thereto.

* * * * *